(12) United States Patent
Rastogi et al.

(10) Patent No.: US 6,185,549 B1
(45) Date of Patent: Feb. 6, 2001

(54) METHOD FOR MINING ASSOCIATION RULES IN DATA

(75) Inventors: Rajeev Rastogi, New Providence; Kyuseok Shim, Bedminster, both of NJ (US)

(73) Assignee: Lucent Technologies Inc., Murray Hill, NJ (US)

( * ) Notice: Under 35 U.S.C. 154(b), the term of this patent shall be extended for 0 days.

(21) Appl. No.: 09/069,135

(22) Filed: Apr. 29, 1998

(51) Int. Cl.$^7$ .................................................. G06F 17/00
(52) U.S. Cl. .................................. 706/45; 706/6; 706/45
(58) Field of Search .............................. 706/45, 46, 47; 707/101, 6

(56) References Cited

U.S. PATENT DOCUMENTS

| | | | |
|---|---|---|---|
| 5,724,573 | * 3/1998 | Agrawal et al. | 707/6 |
| 5,809,499 | * 9/1998 | Wong et al. | 707/6 |
| 5,813,003 | * 9/1998 | Chen et al. | 707/6 |
| 5,842,200 | * 11/1998 | Agrawal et al. | 707/1 |
| 5,920,855 | * 7/1999 | Aggarwal et al. | 707/3 |
| 5,943,667 | * 8/1999 | Aggarwal et al. | 707/3 |
| 5,970,482 | * 10/1999 | Pham et al. | 706/16 |
| 6,012,058 | * 1/2000 | Fayyad et al. | 707/6 |
| 6,061,682 | * 5/2000 | Agrawal et al. | 707/6 |
| 6,092,064 | * 7/2000 | Aggarwal et al. | 707/6 |

OTHER PUBLICATIONS

Rakesh Agrawal and Ramakrishnan Srikant. Fast algorithms for mining association rules. In Proc. of the VLDB Conference, Santiago, Chile, Sep. 1994, 13 pages.

Takeshi Fukuda, Yasuhiko Morimoto, Shinichi Morishita, and Takesh Tokuyama. Mining optimized association rules for numeric attributes. In *Proc. of the ACM SIGACT–SIGMOD–SIGART Symposium on Principles of Database Systems*, Jun. 1996, pp. 182–191.

Brian Lent, Arun Swami, and Jennifer Widom. Clustering association rules. In *Int'l Conference on Data Engineering*, Birmingham, U.K., Apr. 1997, pp. 1–25.

Hannu Toivonen. Sampling large databases for association rules. In *Proc. of the 22nd VLDB Conference*. Mumbai (Bombay), India, 1966, pp. 1–12.

* cited by examiner

*Primary Examiner*—Paul R. Lintz
*Assistant Examiner*—Anil Khatri
(74) *Attorney, Agent, or Firm*—Wilford L. Wisner (57) ABSTRACT

An electronic data mining process for mining from an electronic data base using an electronic digital computer a listing of commercially useful information of the type known in the art as an association rule containing at least one uninstantiated condition. For example, the commercially useful information may be information useful for sales promotion, such as promotion of telephone usage. The computer retrieves from the database a plurality of stored parameters from which measures of the uninstatiated condition can be determined. The computer uses a dynamic programming algorithm and iterates over intervals or subranges of the parameters to obtain what is called an at least partially optimized association rule, as optimized intervals or sub-ranges of at least some of the retrieved parameters, for example, time intervals of high usage of certain types of telephone connections. These optimized intervals are provided as the listed commercially useful information. The amount of needed iteration is reduced in some cases by using so-called bucketing and divide-and-conquer techniques. Extension of the process for a plurality of uninstantiated conditions is described.

10 Claims, 3 Drawing Sheets

OPTIMUM REGIONS IN TWO-DIMENSIONAL SPACE

FIG. 2B

PROPOSED PARTITIONING LINES

FIG. 2C

GENERAL FORM AND COMPLEXITY OF PARTITIONED REGIONS

FIG. 3

OPTIMUM REGIONS
PARTITIONING LINES
PARTITIONING LINES
OPTIMUM REGIONS
OPTIMUM REGIONS
PARTITIONING LINES

FIG. 4A
OPTIMIZED SUPPORT

FIG. 4B
OPTIMIZED GAIN

METHOD FOR MINING ASSOCIATION RULES IN DATA

BACKGROUND OF THE INVENTION

1. Field of the Invention

This invention relates to an electronic data processing method for mining an at least partially optimized association rule from a data set, and particularly for mining from the data set a plurality of separate (disjoint) such rules containing uninstantiated numeric attributes.

2. Discussion of the Related Art

Mining association rules on large data sets has received considerable attention in recent years. Association rules are useful for discovering previously unappreciated aspects of the data, or, in other terms, determining correlations between attributes of a relation. Association rules are said to be optimized when focusing on characteristics that are, in some respect, the most interesting for a particular application. Such association rules have been applied in marketing, financing, and retailing, for example.

Optimized association rules are permitted to contain uninstantiated attributes and the problem is to determine instantiations such that the support, confidence, or gain of the rule is maximized. Instantiated attributes are attributes represented by certain stated elements of the data points in the data set and may be either numerical, such as a time period, or categorical, such as a city name. Uninstantiated attributes are attributes represented by numerical variables derivable from stated numerical elements of the data points in the data set, such as time periods that are variable combinations of the stated time periods. Support, confidence, and gain will be defined hereinafter.

The volume of critical business data stored in databases is expected to grow considerably in the near future. Many organizations have become unable to collect valuable insights from their own data, partly because most of the information is stored implicitly in the large amount of data. As a result, there arises a demand for new tools to enable business organizations to gather such valuable insights.

Association rules provide a useful mechanism for discovering correlations among the underlying data. In its most general form, as association rule can be viewed as a combination or conjunction of conditions employing the data in the database and satisfying user-specified minimum support and minimum confidence constraints. A large number of different schemes for providing such association rules have been proposed. Association rules that are termed "optimized" are useful for unraveling ranges for numeric attributes where certain trends or correlations are strong. A typical limitation of such previously proposed optimized association rules is that only a single optimum interval for a single numeric attribute can be determined. Such a solution may miss some very significant or very interesting local trends in the data. For many applications, it is desirable to find a plurality of different (disjoint) optimum intervals in the data and to find them as efficiently as possible.

SUMMARY OF THE INVENTION

According to the invention, a method is provided for mining an at least partially optimized association rule from a data set for every point of which support, confidence, and gain are available, the at least partially optimized association rule containing at least one uninstantiated condition A, comprising the steps of providing the data set in a form usable by an electronic central processing unit; computing in the central processing unit via a dynamic programming algorithm a plurality k of separate regions of the uninstantiated condition A having optimal support, each region having at least a minimum confidence, each optimal separate region being optSet(i, j, l), where each interval (i, j) contains at most l non-overlapping intervals, the dynamic programming algorithm being:

```
                    procedure optSup1D(i, j, l)
begin
1.  if computed (optSet(i, j, l)) = true
2.     return optSet(i, j, l)
3.  if conf((i, j)) ≧ minConf {
4.     optSet(i, j, l): = ((i, j))
5.     return optSet(i, j, l)
6.  }
7.  tmpSet := 0
8.  if i < j {
9.     if l = 1
10.       tmpSet := maxSupSet(optSup1D(i, j − 1, 1), optSup1D(j +
              1, j, 1))
11.    else
12.       for r:= i to j − 1 do
13.          tmpSet := masSupSet(tmpSet, optSup1D(i, r, 1) ∪
                optSup1D(r + 1, j, l − 1))
14. }
15. optSet(i, j, l) := maxSupSet(optSet(i, j, l), tmpSet)
16. return optSet (i, j, l)
end,
``` where the algorithm is initially invoked with i=1, J=n, where n is the total number of values of the same type in the data set, k=1 (or other desired value of k), and recursion occurs on i and j for each value of k; and delivering from the electronic central processing unit to a utilization apparatus a signal representing each optSet (i, j, l) for the plurality k of separate regions.

According to subsidiary features of the invention, bucketing and divide-and-conquer techniques are employed to reduce the complexity of the calculations.

According to a further aspect of the invention, a plurality of uninstantiated conditions can be used, in which case the partial (or local) optimums will be approximate if k exceeds 3.

It is believed to be significant to the success of the invention, and, in particular, to the success of the dynamic programming algorithm, that, as has been discovered pursuant to the present invention, that, for one uninstantiated condition, the following conditions are always satisfied by the use of the dynamic programming algorithm:

```
If, for i < j, conf((i, j)) < minConf, then the optimized set optSet(i, j, l) is
● l = 1: optSet(i, j-1, 1), if sup(optSet(i, j-1, 1) < sup(optSet(i + 1, j, 1).
   (optSet(i + 1, j, 1), otherwise.
● l = 1: optSet(i, r, 1) ∪ optSet(r + 1, j, l-1), where i ≦ r < j is such that
   sup(optSet(i, r, 1) ∪ optSet(r + 1, j, l − 1)) is maximum.
```

BRIEF DESCRIPTION OF THE DRAWING

Further features and advantages according to the invention will be apparent from the following detailed description, taken together with the drawing, in which:

FIGS. 2A, 2B, 2C, and 3 show diagrams

DETAILED DESCRIPTION

Figure 1:
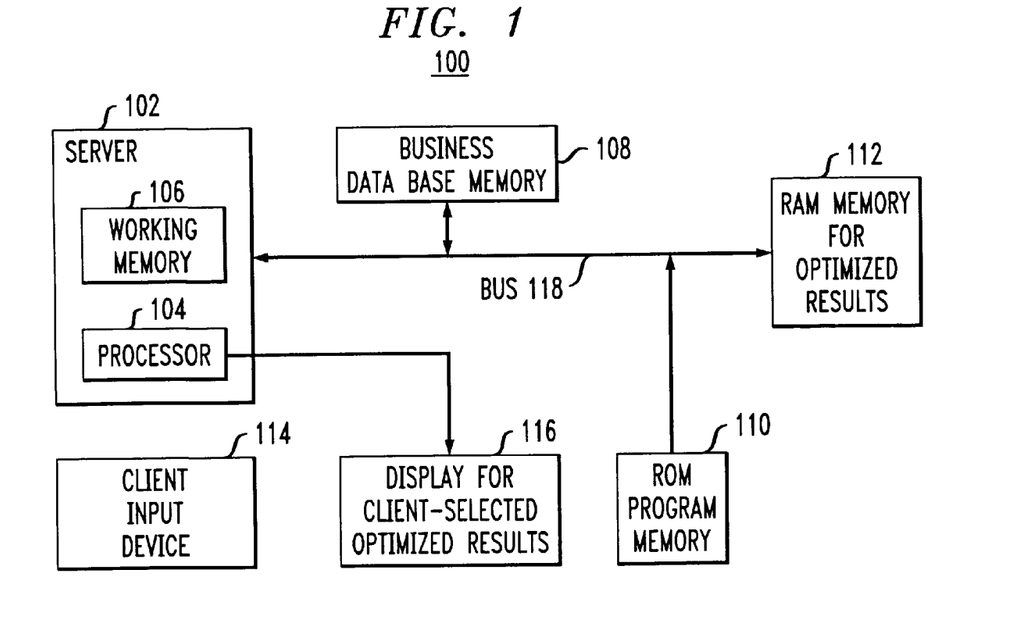
FIG. 1 shows a block diagram of an electronic computational system that uses and benefits from the use of the invention.

FIG. 1 shows in simplified form the architecture of a computational system 100 that implements according to the present invention a method of deriving a plurality of optimized ranges for a variable comprising part of an association rule of particular interest for a business owning the extensive business data base 108. Specifically shown is a server 102 which may be a mainframe computer or a work station containing a processor 104 and a working memory 106. A data bus 118 connects the server 102 to the business data base memory 108. A ROM program memory 110 containing stored algorithms according to the present invention supplies them to process 104 or server 102 via bus 118. The computed optimized results are sent to RAM memory 112 through bus 118. The client/user inputs relevant constraints on the method via input device 114. He can also thereby select a portion of the calculated results for display on the display 116 independently of ROM program memory 110.

As indicated previously, the techniques of data mining, also known as knowledge discovery can enable the user or owner of business data base memory 108 to exploit the data more effectively and extract insightful information that was hidden in the data or was very difficult to extract without such techniques.

Association rules are known to provide a useful mechanism for discovering correlations among the underlying data. In its most general form, an association rule can be viewed as being defined over attributes of a relation, and has the form $C_1 \rightarrow C_2$, where $C_1$ and $C_2$ are conjunctions of conditions, and each condition is either $A_i = v_i$ or $A_i \epsilon (l_i, u_i)$, where $v_i$, $l_i$, and $u_i$ are values from the domain of the attribute $A_i$. Each rule has an associated support and confidence. Let the support of a condition $C_1$ be the ratio of the number of tuples satisfying $C_1$ and the number of tuples in the relation. The support of a rule of the form $C_1 \rightarrow C_2$ is the same as the support of $C_1 \wedge C_2$, while its confidence is the ratio of the supports of conditions $C_1 \wedge C_2$ and $C_1$. The association rules problem is that of computing all association rules that satisfy user-specified minimum support and minimum confidence constraints, and a few schemes for this can be found in the literature.

For example, consider a relation in a telecommunications service provider database that contains call detail information. The attributes of the relation are date, time, src_city, src_country, dst_city, dst_country and duration. A single tuple in the relation thus captures information about the two endpoints of each call, as well as the temporal elements of the call. The association rule (src_city=NY)→(dst_country=France) would satisfy the user-specified minimum support and minimum confidence of 0.05 and 0.3, respectively, if at least 5% of total calls are from NY to France, and at least 30% of the calls that originated from NY are to France.

The optimized association rules problem was motivated by applications in marketing and advertising. An association rule $\Re$ has the form $A_1 \epsilon (l_i, u_i) \wedge C_1 \rightarrow C_2$, where $A_1$ is a numeric attribute, $l_i$ and $u_i$ are uninstantiated variables, and $C_1$ and $C_2$ contain only instantiated conditions (that is, the conditions do not contain uninstantiated variables). Also, the gain of rule $\Re$, denoted by gain($\Re$), is defined to be the difference between the support of $A_1 \epsilon (l_i, u_i) \wedge C_1 \wedge C_2$ and the support of $A_1 \epsilon (l_i, u_i) \wedge C_1$ times the user-specified minimum confidence. The present invention includes algorithms for determining values for the uninstantiated variables $l_i$ and $u_i$ for each of the following cases:

Confidence of $\Re$ is maximized and the support of the condition $A_1 \epsilon (l_i, u_i) \wedge C_1$ is at least the user-specified minimum support (referred to as the optimized confidence rule).

Support of the condition $A_1 \epsilon (l_i, u_i) \wedge C_1$ is maximized and confidence of $\Re$ is at least the user-specified minimum confidence (referred to as the optimized support rule).

Gain of $\Re$ is maximized and confidence of $\Re$ is at least the user-specified minimum confidence (referred to as the optimized gain rule). Optimized association rules are useful for unraveling ranges for numeric attributes where certain trends or correlations are strong, (that is, have high support, confidence or gain). For example, suppose the telecommunication service provider mentioned earlier was interested in offering a promotion to NY customers who make calls to France. In this case, the timing of the promotion may be critical. For its success, it would be advantageous to offer it close to a period of consecutive days in which the maximum number of calls from NY are made and a certain minimum percentage of those calls from NY are to France. It is known to determine such periods. Consider, for example, the association rule (date$\epsilon (l_i, u_i)$ $\wedge$src_city=NY→dst_country=France. With a minimum confidence of 0.5, the optimized support rule results in the period during which at least 50% of the calls from NY are to France, and the number of calls originating in NY is maximum. Similarly, with a minimum confidence of 0.5, the optimized gain rule results in the period in which the calls from NY to France exceeds 50% of the total calls from NY, and furthermore, the number of these excess calls is maximum.

A limitation of the optimized association rules described heretofore is that only a single optimal interval for a single numeric attribute can be determined. However, in a number of applications, a single interval may be an inadequate description of local trends in the underlying data. For example, suppose the telecommunication service provider is interested in doing up to k promotions for customers in NY calling France. For this purpose, we need a mechanism to identify up to k periods during which a sizable number of calls from NY to France are made. If association rules were permitted to contain disjunctions of uninstantiated conditions, then we could determine the optimal k (or fewer) periods by finding optimal instantiations for the rule: (date$\epsilon$ $(l_i, u_i) \vee \ldots \vee$(date$\epsilon (l_k, u_k)$$\wedge$src_city=NY→dst_country= France. This information can be used by the telecommunication service provider to determine the most suitable periods for offering discounts on international long distance calls to France. The above framework has been further strengthened by enriching association rules to contain more than one uninstantiated attribute. Thus, optimal instantiations for the rule (date$\epsilon (l_i, u_i)) \wedge$(duration$\epsilon (l_i, u_i)) \vee \ldots$ $\vee$(date$\epsilon (l_k, u_k)) \wedge$(duration $\epsilon (l_k, u_k))$→dst_country=France would yield valuable information about types of calls (in terms of their duration) and periods with a fairly high call volume, a substantial portion of which is directed to France.

According to the present invention, association rules are enabled to contain up to k disjunctions over one or two uninstantiated numeric attributes. For one attribute, the invention uses dynamic programming algorithm for computing the optimized association rule and whole complexity is $O(n^2 k)$, where n is the number of values in the domain of the uninstantiated attribute. Two subsidiary features of the present invention significantly improve the computational complexity of the novel algorithm. The first is a bucketing algorithm that coalesces contiguous values—all of which have confidence either greater than minConf or less than minConf. The second is a divide and conquer strategy that splits the original problem into multiple smaller subproblems and then combines the solutions for the subproblems. This not only drastically reduces the computation to be performed but also reduces storage requirements, thus permitting the algorithm to execute in main-memory even for large databases. Experimental results indicate that the two optimizations enable the dynamic programming algorithm to scale almost linearly with both the domain size n and the number of disjunctions k. In addition, the subsidiary features make it possible to handle inputs for which values of n and k are as large as 100,000 and 250, respectively, in a few minutes. For two attributes, the dynamic programming algorithm computes approximate association rules. For the optimized gain case, the approximations are within a constant factor of the optimized rule using recent results on binary space partitioning.

The data is assumed to be stored in a relation defined over categorical and numeric attributes. Association rules are built from atomic conditions each of which has the form $A_i = v_i$ ($A_i$ could be either categorical or numeric) or $A_i \in (l_i, u_i)$ (only if $A_1$ is numeric). For the atomic condition $A_1 \in (l_i, u_i)$, if $l_i$ and $u_i$ are values from the domain of $A_1$, the condition is referred to as instantiated; otherwise, if they are variables, the condition is referred to as uninstantiated.

Atomic conditions can be combined using operators $\wedge$ (and) or $\vee$ (or) to yield more complex conditions. Instantiated association rules have the form $C_1 \rightarrow C_2$, where $C_1$ and $C_2$ are arbitrary instantiated conditions. Let the support for an instantiated condition C, denoted by sup(C), be the ratio of the number of tuples satisfying the condition C and the total number of tuples in the relation. Then, for the association rule $\Re$: $C_1 \rightarrow C_2$, sup($\Re$) is defined as sup(C1) and conf ($\Re$) is defined as $sup(C_1 \wedge C_2)/sup(C_1)$. Note that for the present invention the definition of sup($\Re$) is different from the more typical definition where sup($\Re$) was defined to be $sup(C_1 \wedge C_2)$. Instead, a less typical definition applies. Also, let minConf denote the user-specified minimum confidence. Then, gain ($\Re$) is defined to be the difference between $sup(C_1 \wedge C_2)$ and minConf times sup(C1). In other words, gain ($\Re$) is sup$(C_1 \wedge C_2) - \text{minConf} \bullet \text{sup}(C_1) = \text{sup}(\Re) \bullet (\text{conf}(\Re) - \text{minConf})$.

The optimized association rule problem requires optimal instantiations to be computed for an uninstantiated association rule that has the form: $U \wedge C_1 \rightarrow C_2$, where U is a conjunction of 1 or 2 uninstantiated atomic conditions over distinct numeric attributes, and $C_1$ and $C_2$ are arbitrary instantiated conditions. For simplicity, assume that the domain of an uninstantiated numeric attribute is $\{1, 2, \ldots, n\}$. Depending on the number, one or two, of uninstantiated numeric attributes, consider a one or two-dimensional space with an axis for each uninstantiated attribute, and values along each axis corresponding to increasing values from the domain of the attributes. Note that if one considers a single interval in the domain of each uninstantiated attribute, then their combination results in a region. For the one dimensional case, this region $(l_1, u_1)$ is simply the interval $(l_1, u_1)$ for the attribute; for the two dimensional case, the region $((l_1, l_2), (u_1, u_2))$ is the rectangle bounded along each axis by the endpoints of the intervals $(l_1, u_1)$ and $(l_2, u_2)$ along the two axis. Suppose, for a region $R=((l_1, l_2), (u_1, u_2))$ (or alternately, $(l_1, u_1)$), we define conf (R), sup(R) and gain(R) to be conf, sup and gain, respectively, for the rule $A_1 \in (l_1, u_1) \wedge A_2 \in (l_2, u_2) \wedge C_1 \rightarrow C_2$ (or alternately, $A_1 \in (l_1, u_1) \wedge C_1 \rightarrow C_2$). In addition, for a set of non-overlapping regions, $S=(R_1, R_2, \ldots, R_j)$, $R_i=((l_{i1}, l_{i2}), (u_{i1}, u_{i2}))$, we define conf(S), sup(S) and gain (S) to be the conf, sup and gain, respectively of the rule $\vee^i_{i=1}(A_1 \in (l_{i1}, u_{i1}) \wedge A_2 \in (l_{i2}, u_{i2})) \wedge C_1 \rightarrow C_2$. For one dimension, in which case each $R_i=(l_{i1}, u_{i1})$, conf (S), sup(S) and gain(S) are defined to be the conf, sup and gain, respectively of the rule $\vee^i_{i=1}(A_1 \in (l_{i1}, u_{i1})) \wedge C_1 \rightarrow C_2$. Note that, since $R_1, \ldots, R_j$ are non-overlapping regions, the following hold for set S.

$$sup(S) = sup(R_1) + \ldots + sup(R_j)$$

$$gain(S) = gain(R_1) + \ldots + gain(R_j)$$

$$conf(S) = \frac{sup(R1) \cdot conf(R_1) + \ldots + sup(R_j) \cdot conf(R_j)}{sup(R_1) + \ldots + sup(R_j)}$$

Having defined the above notation for association rules, we present below, the formulations of the optimized association rule problems for support(gain). Given k, determine a set S containing a most k regions such that for each region $R_i \in S$, conf $(R_i) \geq$ minConf and sup(S) is maximized (gain(S) is maximized). We refer to the set S as the optimized support(gain) set.

Example 3.1: Consider the telecommunication service provider database (discussed above) containing call detail data for a one week period. Table 1 presents the summary of the relation for the seven days—the summary information includes, for each date, the total # of calls made on the date, the # of calls from NY and the # of calls from NY to France. Also included in the summary are the support and confidence, for each date v, of the rule date=v$\wedge$src_city=NY$\rightarrow$dst_country=France. The total number of calls made during the week is 2000.

Suppose we are interested in discovering the interesting periods with heavy call volume from NY to France (a period is a range of consecutive days). Then, the following uninstantiated association rule can be used.

date$\in$(l, u)$\wedge$src_city=NY$\rightarrow$dst_country=France

TABLE 1

| Date | 1 | 2 | 3 | 4 | 5 | 6 | 7 |
|---|---|---|---|---|---|---|---|
| # of total calls | 340 | 280 | 230 | 170 | 220 | 400 | 360 |
| # of calls from NY | 170 | 140 | 105 | 95 | 100 | 200 | 180 |
| # of calls from NY to France | 90 | 65 | 35 | 18 | 75 | 50 | 95 |
| support | 0.085 | 0.07 | 0.052 | 0.047 | 0.05 | 0.1 | 0.09 |
| confidence | 0.53 | 0.46 | 0.33 | 0.19 | 0.75 | 0.25 | 0.53 |

Summary of call detail data for a one week period
In the above rule, U is date$\in$(l, u), C1 is Src_city=NY and C2 is dst_country=France. Let us assume that we are interested in at most 2 periods (that is, k=2) with minConf= 0.50. The optimized rules are as follows.

Optimized Support Set: ((1,2),(7,7)) in Table 1
We require up to two periods such that the percentage of calls during each of the periods from NY that are to France is at least 50%, and the number of calls from NY is maximized. Of the possible periods (1,2), (5,5) and (7,7), only (1,2) has the maximum support, followed by (7,7) and finally by (5,5). Thus, the optimized support set is {(1,2), (7,7)}.

Optimized Gain Set: ((5,5), (7,7)) in Table 1
We require up to two periods such that the percentage of calls during each of the periods from NY that are to France is at least 50%, and the gain is maximized. Of the possible periods (1,2), (5,5) and (7,7), note that the gain in period (1,2) is 0. Thus, the optimized gain set is ((5,5), (7,7)).

In the remainder of the description, it is assumed that the support, confidence and gain for every point in a region are available. These can be computed by performing a single pass over the relation (the relevant data set). The points, along with their supports, confidences and gains, thus constitute the input to our algorithms. Thus, the input size is n for the one-dimensional case, while for the two-dimensional case, it is $n^2$.

One Numeric Attribute

A method is now set forth for computing optimized support and gain sets when association rules contain a single uninstantiated numeric attribute. Thus, the uninstantiated rule has the form: $A_1 \epsilon (l_i, u_i) \wedge C_1 \# C_2$, where A1 is the uninstantiated numeric attribute. Before describing the dynamic programming algorithm, according to the invention, for computing optimized support and gain sets, two simplifying preprocessing algorithms will be described. The first preprocessing algorithm is for collapsing certain contiguous ranges of values in the domain of the attribute into a single bucket, thus reducing the size of the input n. The second preprocessing algorithm is a divide and conquer reduces the computational complexity and memory requirements of the dynamic programming algorithm.

Bucketing

For the one-dimensional case, each region is an interval and since the domain size is n, the number of possible intervals is $O(n^2)$. Now, suppose we could split the range 1, 2, . . . , n into b buckets, where b<n, and map every value in $A_1$'s domain into one of the b buckets to which it belongs. Then the new domain of $A_1$ becomes $\{1, 2, \ldots, b\}$ and the number of intervals to be considered becomes $O(b^2)$. This domain could be much smaller, thus reducing the time and space complexity of the follow-on algorithms. Note that the reduction in space complexity also results in reduced memory requirements for the follow-on algorithms.

There are two considerations that we must take into account when assigning values in $A_1$'s domain to buckets. The first is that the bucketing procedure must not adversely impact the optimality of the optimized set—that is, the optimized set computed on the buckets must be identical to the one computed using the raw domain values. In order to ensure this, the bucketing procedure must be such that no interval in the optimized set computed prior to bucketing contains a subset of the values assigned to a bucket.

The second consideration has to do with the complexity of the bucketing procedure. The input to the bucketing algorithm is the support, confidence and gain for each of the n values in $A_1$'s domain, sorted in increasing order of the values. We would prefer for the time complexity to be linear in n and the procedure to perform a single pass over the input data. This way, even if n is large or if the information on supports, confidences and gains for the n points does not fit in memory, the b buckets can still be computed efficiently in a single scan of the data.

The following bucketing algorithm meets both of the above-mentioned requirements. They do not compromise the optimality of the optimized sets and have time complexity O(n). The output of the algorithms is the b buckets with their supports, confidences and gains, and these become the input to the subsequently described dynamic programming algorithms. Our experimental results show the effectiveness of our bucketing algorithms. Due to them, we were able to obtain reductions in excess of 50% in input sizes and improvements of more than 90% in the execution times of our algorithms.

Optimized Support

For optimized support sets, contiguous values in the domain of the uninstantiated attribute for which the confidence is greater than or equal to minConf are collapsed into a single bucket by our bucketing algorithm. Each other value j whose confidence is less than minConf is assigned to a separate bucket—the bucket contains only the value j. In other words, if values in interval (i, j) are assigned to a bucket than either 1. for all $i \leq l \leq j$, confidence of (l, l) is at least minConf, or
2. i=j and confidence of (i, i) is less than minConf. For example, let the domain of $A_1$ be $\{1, 2, \ldots, 6\}$ and confidences of 1, 2, 5 and 6 be greater than or equal to minConf, while confidences of 3 and 4 be less than minConf. Then, the bucketing scheme generates 4 buckets, the first containing values 1 and 2, the second and third containing values 3 and 4, respectively, and the fourth containing values 5 and 6. It is straightforward to observe that assigning values to buckets can be achieved by performing a single pass over the input data.

Furthermore, the following theorem can be used to show that the above bucketing scheme preserves the optimality of the computed optimized sets.

Theorem I: Let S be an optimized support set. Then, for any interval (i; j) in S, it is the case that conf ((i−1, i−1))<minConf and conf ((j+1, j+1))>minConf.

From the above theorem, which is readily proved, it follows that for any set of contiguous values, each of which has confidence at least minConf, either all of the values are contained in the optimized set or none of them are. The reason for this is that if the optimized set contained some of the values and not all the values, then for some interval (i, j) in the optimized set, either i−1 or j+1 would be one of the values with confidence at least minConf—thus violating Theorem I Thus, each interval in the optimized set computed prior to bucketing, either contains all the values assigned to a bucket or none of them. As a result, the optimized set can be computed using the buckets instead of the initial domain values.

Optimized Gain

For optimized gain sets, we begin by making the following simple observation—values in $A_1$'s domain whose confidence is exactly minConf have a gain of 0 and can thus be ignored. Including these values in the optimized gain set does not affect the gain of the set and so we can assume that for every value in $\{1, 2, \ldots, n\}$ either the confidence is greater than minConf or less than minConf.

Similar to the case for optimized support, the bucketing procedure for optimized gain collapses contiguous values whose confidence is greater than minConf into a single bucket. However, unlike the optimized support case in which each value with confidence less than minConf is assigned to a separate bucket, the bucketing algorithm for optimized gain also combines contiguous values each of whose confidence is less than minConf, into a single bucket. Thus, for any interval assigned to a bucket, it is the case that either all values in the interval have confidence greater than minConf or all values in the interval have confidence less than minConf. For instance, for the previous example in which the domain of $A_1$ was $\{1, 2, \ldots, 6\}$ with confidence of values 1, 2, 5 and 6 being greater than minConf, the bucketing algorithm generates only three buckets—the first containing values 1 and 2, the second 3 and 4, and the third containing values 5 and 6 (recall that the bucketing algorithm for optimized support generated four buckets). Again, it trivially follows that the bucketing algorithm only requires a single pass over the input data.

In order to show that the above bucketing algorithm does not violate the optimality of the optimized set, we use the result of the following theorem.

Theorem II: Let S ban an optimized gain set. Then, for any interval (i, j) in S, it is the case that conf ((i−1, i−1)) <minConf, conf (j+1;/j+1])>minConf, conf ((i, i))>minConf, conf((j, j))>minConf. The theorem is readily proved.

From the above theorem, it follows that if (i, j) is an interval in the optimized set, then values i and i−1 cannot both have confidence greater than or less than minConf. The same holds for values j and j+1. Thus, for a set of contiguous values if the confidences of each and every value is greater than (or are less than) minConf, then the optimized gain set either contains all of the values or none of them. Thus, an interval in the optimized set either contains all the values in a bucket or none of them—as a result, the optimized set can be computed using the buckets instead of the original values in the domain. Thus, due to Theorem II, the input size for the optimized gain problem can be reduced significantly without sacrificing optimality, and this results in significant improvements in execution time as well as storage requirements.

Dynamic Programming Algorithm For Optimized Support

In this subsection, we present a dynamic programming algorithm for the optimized support problem for one dimension. The input to the algorithm is the b buckets generated by our bucketing scheme, above, along with their confidences and supports. The object is to determine a set of at most k (non-overlapping) intervals such that the confidence of each interval is greater than or equal to minConf and support of the set is maximized.

Suppose optSet(i, j, l) denotes the optimized set for interval (i, j, l) containing at most l (non-overlapping) intervals of the k sought-for-maximum non-overlapping intervals. Thus, for every interval (p, q) in the set, confidence is at least minConf, and $i \leq p \leq q \leq j$.

It is fairly straightforward to observe that optSet(i, i, l) for all l=(1, . . . , k) is (i, i) if conf ((i; i))≧minConf. Otherwise, it is ∅. Similarly, for i<j, if conf ((i, j))≧minConf, then optSet(i, j, l) for all l=(1, . . . , k) is (i, j). On the other hand, if conf ((i, j))>minConf, then optSet for the interval bounded by i and j can be computed from the optSet values for its subintervals.

Theorem III: If, for i<j, conf{(i, j)}<minConf, then the optimized set optSet(i, j, l) is

- l = 1: optSet(i, j−1, 1), if sup(optSet(i, j−1, 1) > sup(optSet(i + 1, j, 1)). (optSet(i + 1, j, 1), otherwise.
- l > 1: optSet(i, r, 1) ∪ optSet(r + 1, j, l−1), where i ≦ r < j is such that optSet(i, r, 1) ∪ optSet(r + 1, j, l−1) is maximum.

The above theorem enables us to use dynamic programming in order compute optSet(1, b, k). As shown in the diagram below, we can compute optSet(1, b, k) by computing optSet(1, i, 1) and optSet(i+1, b, k−1) for all i=1, . . . , b−1 (in case conf((1, b, k))>minConf). optSet(1, i, 1) in turn can be computed by computing optSet(1; i−1; 1) and optSet (2, i, 1), while optSet(i+1, b, k−1) could require optSet(i+1, j, 1) and optSet(j+1, b, k−2) to be computed for (j=i+1, . . . , b−1).

Thus, optSet(2, b, k−1) and optSet(3, b, k−1) could both require optSet(4, b, k−2) to be computed. However, instead of computing optSet(4, b, k−2) twice for these separate cases, we can compute optSet(4, b, k−2) once (the first time it is required) and then use this computed value if it is required again (instead of recomputing it). Also note that for all pairs i, j, i<b and j≠b, we only require optSet(i, j, 1) to be computed. However, for i=2, . . . , b, optSet(i, b, l) could be needed for all l=1, . . . , k−1.

Invoking the Dynamic Programming Algorithm

Before the dynamic programming algorithm, as set out below, for computing optSet(i, j, l) is invoked, we assume that conf ((i, j)) and sup((i, j)) are precomputed for every interval (i, j). The array optSet in working memory 106 is used to store the optimized sets for the various intervals, and the entries of the array are initially set to ∅.

Procedure optSup1D first checks if optSet(i, j, l) has already been computed (by invoking the function computed in Step 1). If so, then the optimized set stored in optSet(i, j, l) is returned. Otherwise, the algorithm calculates optSet(i, j, l) using the results of Theorem III. It first checks the confidence of (i, j) to see whether it is at least minConf. If this is the case, then optSet(i, j, l) is the interval (i, j) itself since it has the maximum possible support in (i, j). However, if the confidence of (i, j) is less than minConf, then the two cases are when l=1 and l>1. For l=1, the interval of interest must be in either (i, j−1) or i+1;j). The function maxSupSet in Step 10 takes two or more optSets as arguments and returns the set with the maximum support. On the other hand, if l>1, then one of the interval of interest must lie in (i, r) and the other , for i−1, must line in (r+1, j) for some i≦r<j. Thus, optSet (i, j, l) is set to the union of the optSets for the pair of intervals with the maximum support. Note that if optSup1D was initially invoked with parameters 1, b and k, then when Step 12 of the algorithm is executed, the value of j is always b.

The algorithm is initially invoked with i=1, j=n (or b), and l=1, or other currently sought-for value of the k maximum non-overlapping intervals. Recursion then occurs on i and j, with i increasing and j decreasing. The variable l arrives at its local maximum when no further optimum interval can be found in the selected computing range.

Algorithm for computing 1D optimized support set
procedure optSup1D(i, j, l)

```
begin
1.     if computed (optSet(i, j, l)) = true
2.         return optSet(i, j, l)
3.     if conf((i, j)) ≧ minConf {
4.         optSet(i, j, 1): = ((i, j))
5.         return optSet(i, j, l)
6.     }
7.     tmpSet := 0
8.     if i < j {
9.         if l = 1
10.            tmpSet := maxSupSet(optSup1D(i, j − 1, 1), optSup1D(i + 1,j, 1))
11.        else
12.            for r:= i to j − 1 do
13.                tmpSet : = maxSupSet(optSup1D(i, r, l) ∪ optSup1D(r + 1, j, l − 1))
14. }
15.    optSet(i, j, l) := maxSupSet(optSet(i, j, l), tmpSet)
16.    return optSet (i, j, l)
end.
```

Time and Space Complexity

While not essential to the practice of the invention, there is next computed the complexity of procedure optSup1D when it is invoked with parameters 1, b (less than n) and k. As we mentioned earlier, we precompute the confidence and support for every interval before optSup1D is executed. Since there are $O(b^2)$ possible intervals, the time complexity of this procedure is $O(b^2)$.

The complexity of optSup1D(1, b, k) can be shown to be proportional to the number of times optSup1D is invoked.

The reason for this is that excluding recursive invocations, each invocation of optSup1D incurs a constant overhead. Since recursive invocations (in steps 10 and 13) result in separate invocations of optSup1D and will be counted separately, we do not include these recursive invocations when computing the overhead of an invocation. Since we assume that conf(i, j) for the intervals are computed a priori, the first four steps impose a constant overhead. Also, note that the union of two optSets (in Step 13) can be computed in constant time. Furthermore, by storing with each optSet its support, the support of the union of two optSets can be obtained by simply summing their supports. Thus, since each invocation executes in constant time, we only need to count the maximum number of times optSup1D is invoked. Note that for a given i, j, l, the body of optSup1D is executed only once. Subsequent invocations of optSup1D with i, j, l simply return the previously computed value. Furthermore, it is not possible for j to be less than b and l to be greater than 1 at the same time—that is, if j≠b, then l=1. We thus need to consider the following two cases.

1. j≠b. For a given pair i, j, optSup1D(i, j, 1) can be invoked at most k+1 times—once by optSup1D(i, j+1, 1) (due to Step 10), once by optSup1D(i−1, j, 1) (due to Step 10), and once by optSup1D(i, b, l) for each value of $1 < l \leq k$ (when l>1, j=b in steps 12 and 13). Thus, since the number of possible i, j pairs is $O(b^2)$, if j≠b, optSup1D is invoked $O(b^2k)$ times.

2. j=b. For a given i and l, optSup1D(i, b, l) can be invoked O(b) times, once by optSup1D(p, b, l+1), for every p<i (due to Step 13). Since the number of possible values for i is b and the maximum number of values that l can take is k, if j=b, optSup1D is invoked $O(b^2k)$ times.

From the above discussion, we conclude that the time complexity of our dynamic algorithm is $O(b^2k)$. We may need to compute and store optSet(i, j, 1) and optSet(i, b, l) for every value of i, j and l satisfying $1 \leq i \leq j \leq b$ and $1 \leq l \leq k$.

Thus, the space complexity of our algorithm is $O(b^2+bk)$. Since in general k<b, this becomes $O(b^2)$.

Procedure optSup1D can be further simplified if there is no bound k on the number of intervals in the optimized set. In this case, in invocations of optSup1D(i, j, l), l takes only one of two possible values: the value 1 for computing optimized sets containing a single interval or ∞ for computing optimized sets with no limits on the number of intervals. In order to compute the optimized set, optSup1D is initially invoked with arguments 1, b and ∞. In this context, ∞ is used merely as a convenient symbol meaning that there is no bound on k. For each interval (i, j), let optSet(i, j, ∞) store the optimized set for (i, j) with no bound on the number of intervals. Then, if conf((i, j))≥minConf, optSet(i, j, ∞)=((i, j)). Otherwise, along the lines of Theorem III, optSet(i, j, ∞) is optSet(i, r, 1)∪optSet(r+1, j, ∞), where $i \leq r < j$ is such that sup(optSet(i, r, 1)∪(optSet(r+1, j, ∞)) is maximum. Thus, for intervals (i, b) in the simplified algorithm, we only need to compute two optimized sets, optSet(i, b, 1) and optSet(i, b, ∞). Furthermore, the only change required to procedure optSup1D is to replace optSup1D(r+1, j, l−1) in Step 13 with optSup1D(r+1, j, ∞). The time complexity of the simplified algorithm reduces to $O(b^2)$ since optSup1D(i, j, 1), j≠b, is invoked at most 3 times and optSup1D(i, b, ∞) is invoked at most b times.

Optimized Gain Problem

For the optimized gain problem, we are interested in determining a set of at most k non-overlapping intervals such that the gain of the set is maximum. A dynamic programming algorithm similar to the one for the optimized support problem (presented in the previous subsection) can be used to compute the optimized gain set. The only difference is that in the case of optimized support sets, if for an interval (i, j), conf ((i, j))≥minConf, then the optimized support set for the interval is (i, j) (since interval (i, j) has the maximum support). In the case of optimized gain, however, even if conf ((i, j))≥minConf (that is, gain((i, j))≥0), optSet for interval (i, j) may not be (i, j) since other intervals within (i, j) may have higher gains. Thus, similar to Theorem III for optimized support, we have the following theorem for the optimized gain problem that takes into account the above difference (maxGainSet accepts as input two or more optimized sets and returns the set with the maximum gain).

Theorem IIII: For i<j, optSet(i, j, l) is

● l = 1: maxGainSet((i, j), optSet(i, j − 1, 1), optSet(i + 1, j, 1)).
● l > 1: maxGainSet((i, j), optSet(i, i, 1) ∪ optSet (i + 1, j, l − 1), . . . , optSet(i, j − 1, 1 ∪ optSet(i, j, l − 1)).

The dynamic programming algorithm for computing the optimized gain set optSet(i, j, l) is similar to optSup1D except that in Step 3, if conf ((j, j))≥minConf, then we must not return optSet as is done in Step 5 since subintervals of (i, j) may have higher gains. Furthermore, all calls to optSup1D and maxSupSet in the procedure must be replaced with calls to optGain1D and maxGainSet, respectively.

Divide and Conquer The dynamic programming algorithms for computing optimized sets presented in the previous sections had time complexity $O(b^2k)$ and space complexity $O(b^2)$, where b is the number of input buckets. In this section, we propose a divide and conquer algorithm that partitions the range consisting of b buckets into subranges and uses the dynamic programming algorithms in order to compute optimized sets for each subrange. It then combines the optimized sets for the various subranges to derive the optimized set for the entire range of buckets. Since the input to the dynamic programming algorithm is a subrange whose size is smaller than that of the entire range, the divide and conquer approach reduces the time and space complexity of computing the optimized set for the entire range. The result is reduced execution times and memory requirements, thus allowing our algorithms to execute in main-memory. Our experiments indicate that with the divide and conquer optimization, execution times and storage needs of our algorithms increase linearly (as opposed to quadratically) with the number of input buckets.

In the following subsections, we first present the intuition underlying our divide and conquer approach. We then present a scheme with linear time complexity for splitting the range of buckets into subranges. This makes the scheme practical even for large b and for the case in which the support and confidence information for the b buckets does not fit in main-memory. Finally, we show how the results for the subranges can be combined to yield the optimized set. The same technique is applicable to the computation of both optimized support as well as optimized gain sets. The presentation in this section addresses only the optimized support case.

We first describe the intuition underlying the optimization. Suppose for a bucket p, $1 \leq p \leq b$, it is the case that for every interval (i, j) containing p, we have conf ((i, j))<minConf. Then, since every interval in the optimized support set must have confidence at least minConf, we can conclude that p does not occur in the optimized set. Consequently, every interval in the optimized set must either be to the left of p or to the right of p (none of the intervals can span p). We can thus independently compute optSet)1, p-1, l) and optSet(p+1, b, l), for all $1 \leq l \leq k$, and then set optSet(1, b, k) to be optSet (1, p-1, l)∪optSet(p+1, b, k-l) for the value of l between 0 and k that results in maximum support. Note that optSet(1, p-1, 0) and optSet(p+1, b, 0) are both trivially Ø. Since the optimized set must have $0 \leq r \leq k$ intervals on the left and at most k-r intervals on the right of p, by considering all values of l between 0 and k for optSet(1, p-1, l)∪optSet(p+1, b, k-l), optSet(1, b, k) is guaranteed to be an optimized set.

A generalization of the above idea is to first compute partition points. A partition point is a bucket with the property that every interval containing it has a confidence less than minConf. Thus, no interval in the optimized set can contain a partition point. If $P_1, \ldots, P_{m-1}$ are the partition points in increasing order, then these partition interval (1, b) into m intervals–(1, $P_1$-1), . . . , ($P_{i-1}$+1, $P_1$-1), . . . , ($P_{m-1}$+1, b). The m partitioned intervals have the property that every interval in the optimized set is wholly contained in a single partition. The reason for this is that between any two adjacent partitions, there is a partition point. optSet(1, b, k) can then be computed by computing for every partition (i, j) and for $0 \leq l \leq k$, optSet(i, j, l), and then choosing the combination optSets, for the various partitions, that has the maximum support.

Computing Partition Points

An algorithm of O(b) complexity is now presented for computing the partition points $P_1, \ldots, P_{m-1}$. The key idea underlying the algorithm is as follows. For every bucket j, we first compute the largest interval (i, j) ending at j and with confidence at least minConf. A point $P_i$ is a partition point if for all j>$P_i$, the largest interval ending at j does not contain $P_i$ and no interval ending at $P_l$ has confidence that exceeds minConf. The largest interval with confidence minConf for all buckets can be computed in linear time using recent results from the literature. For example, the notion of effective points is helpful. A bucket s is effective if for all i<s, conf ((i, s-1))<minConf. It is fairly straightforward to observe that if (s, j) is the largest interval with confidence exceeding minConf and ending at j, then s must be an effective point. Also, for an effective point s, if (s, j) has confidence less than minConf, then for every other i<s, conf ((i, j))<minConf.

We are now in a position to describe how procedure computePartition, set out below, utilizes the effective points in order to compute the partition points. It is known show how effective points can be computed in linear time in a single forward pass over the b buckets. See T. Fukuda et al., "Mining optimized association rules for numeric attributes", *Proc. of the ACM SIGACT-SIGMOD-SIGART* Symposium on Principles of Database Systems, June, 1996, which is incorporated herein by reference. Accordingly, it is assumed that there are numEffective effective points that are stored in increasing order in an Array Effective in working memory 106. The above-mentioned properties of effective points make them useful for efficiently computing the largest interval ending at bucket j and with confidence at least minConf. Only effective points preceding j need to be scanned in reverse order until one is encountered, for example s, for which conf ((s, j)) decreases below minConf.

Procedure computePartition simultaneously scans both the input buckets as well as the effective points in the reverse order. The variable j keeps track of the current bucket being scanned while effective(i) is the effective point currently under consideration. Finally, the variable 'earliest' stores the earliest effective point such that there exists an interval with confidence minConf beginning at 'earliest' and ending at a bucket greater than or equal to j. Thus, if for bucket j, j<'earliest', then j is a partitioning point (see steps 10 and 11) since no interval ending at or after j has confidence minConf.

When scanning the buckets and effective points in reverse order, for bucket j, only effective points preceding it are candidates for the longest interval with confidence minConf and ending at j. Furthermore, if conf ((effective(i),j)) $\geq$ minConf (see Step 6), then we next consider the effective point immediately before it (by decrementing i by 1) for the longest interval ending at j. Also, 'earliest' is set to effective (i). On the other hand, if conf ((effective(i),j))<minConf, then we simply consider the bucket preceding j (by decrementing j in Step 12) since the earliest bucket for the longest interval with confidence minConf ending at j cannot be before 'earliest' (if there are effective points between effective(i) and j, 'earliest' stores the effective point immediately following effective (i).)

The algorithm performs two passes over the data—one forward pass to compute the effective points and a reverse pass during which the partition points are computed. Thus, the algorithm is efficient and can be used even if the data is too large to fit in main-memory.

---

Algorithm for generating partition points
procedure computePartition( )

```
begin
1.       partPoints := Ø
2.       earliest := b + 1
3.       j := b
4.       for i := numEffective downto 1
5.           while j ≥ effective(i) do
6.               if conf ((effective(i), j) ≥ minConf){
7.                   earliest := effective(i)
8.                   break (out of while-loop)
9.               } else {
10.                  if j < earliest
11.                      partPoints := partPoints ∪ (j)
12.                  j := j - 1
13.              }
14.      return partPoints
end
```

---

Divide and Conquer Algorithm (Support)

Once the m partitions are generated (from the partitioning points), then procedure divideConquerSup, set out below, can be used to compute the optimized support set. Let lower(i) and upper(i) be the boundary buckets for partition i, and let $b_i$ be the number of buckets in partition i. First, in steps 1 through 5, the optimized set for each partition containing at most 0, . . . , k intervals is computed using optSup1D. Procedure optSup1D(i, j, l) returns the optimized support set whose size is at most l for the interval consisting of buckets i through j. The optimized set of size l for partition i is stored in optSetPart(i, l). Even though, in the for-loop in steps 3–4, optSup1D is invoked k times with the number of intervals ranging from 1 to k, the complexity of the for-loop is still $O(b_i^2 k)$ because the optimized sets for the various intervals in partition i (that are computed during an invocation of optSup1D) can be stored and shared between the k invocations of optSup1D for the partition. Thus, for an arbitrary interval in the partition and a maximum size l for the optimized set, the optimized set is computed only once (the first time it is required).

The optimized sets computed for the various partitions are then merged in steps 6–14. The merging process is carried out in successive steps. In step i, the optimized set for partition i is merged with the result of the merge of partitions 1, . . . , i-1 (that is stored in optSet). Thus, at the end of step i, optSet(j) stores the optimized set containing at most j intervals belonging partitions 1, . . . , i. One needs to compute optSet(j) for all $1 \leq j \leq k$ since the optimized set (containing at most k intervals) for the first i+1 partitions is obtained by combining, during step i+1, optSet(j) and optSetPart(i+1, k−j) for the value of j that causes optSet(k) to be maximized. The complexity of each step of the merge is thus $O(k^2)$ since we need to compute optSet for all values between 1 and k. Since the number of partitions is m, the complexity of steps 6–14 becomes $O(mk^2)$. Thus, the overall complexity of the algorithm becomes $O((b_1^2 + \ldots + b_m^2)k + mk^2)$ where $b \geq b_1 + \ldots + b_m$. If $b_{max}$ denotes the largest value among $b_1, \ldots, b_m$, then the complexity becomes $O(b_{max}^2 mk + mk^2)$. In our experiments, we found that for a large number of cases, $b_{max} \ll b$ and since $k \ll b$, the divide and conquer results in substantial reductions in the computational complexity of our dynamic programming algorithm (whose original complexity is $O(b^2 k)$). In addition, it also reduces the storage and memory requirements of our dynamic programming algorithm from $O(b^2)$ to $O(b_{max}^2)$.

```
Divide and Conquer Algorithm for Optimized Support
              procedure divideConquerSup( )

begin
  1.      for i := 1 to m do {
  2.          optSetPart(i, 0) := Ø
  3.          for l := 1 to k do
  4.              optSetPart(i, l) := optSup1D(lower(i), upper(i), l);
  5.      }
  6.      for i := 0 to k do
  7.          optSet(i) := optSetPart(1, i);
  8.      for i := 2 to m do
  9.          for j := k downto 1 do
  10.             for p := 0 to j do {
  11.                 tmpSet := optSet(j − p) ∪ optSetPart(i, p);
  12.                 if sup(tmpSet) > sup(optSet(j)) then
  13.                     optSet(j) := tmpSet;
  14.             }
  15.     return optSet(k)
  end
```

Two Numeric Attributes

We next consider the problem of mining optimized support and gain sets for the case when there are two uninstantiated numeric attributes. In this case, we need to compute a set of k non-overlapping rectangles in two-dimensional space whose support/gain is maximum. For the one-dimensional case, the dynamic programming algorithm for computing optimized support and gain sets simply considered all possible ways of splitting an interval into two subintervals, and then individually computed the optimized sets for the subintervals. This approach worked since for some split, every interval in the optimized set is wholly contained in one of the two subintervals and is thus contained in the optimized set computed for the subinterval.

Figure 2A:
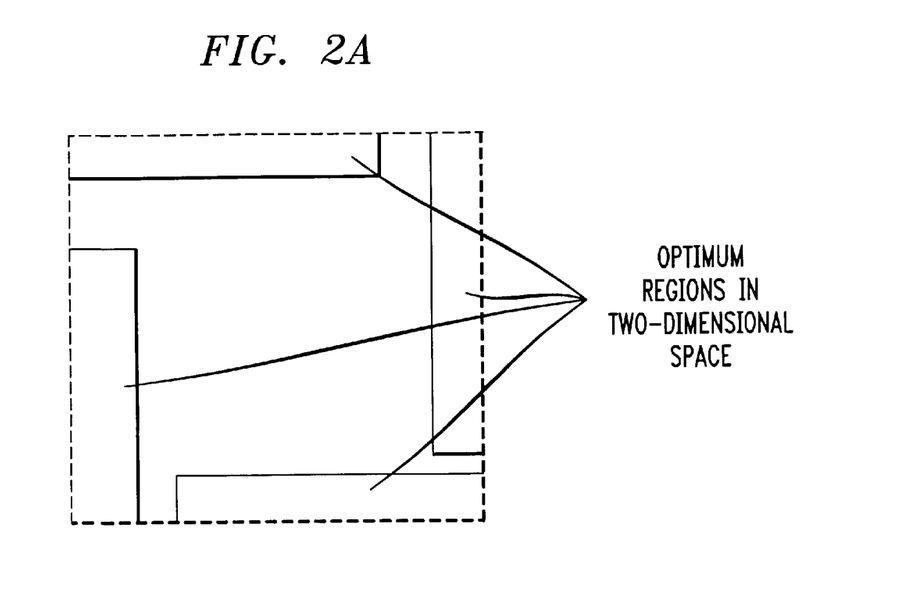

For two dimensions, however, a similar approach of splitting each rectangle into two subrectangles and then combining the optimized sets for each subrectangle may not yield the optimized set for the original rectangle. FIG. 2A shows a rectangle and the optimized set of rectangles for it. It is clear that there is no way to split the rectangle into two subrectangles such that each one rectangle in the optimized set is completely contained in one of the subrectangles and is the only one of the optimized rectangles even partly contained in that one partitioning subrectangle. Thus, a dynamic programming approach that considers all possible splits of the rectangle into two subrectangles (using horizontal and vertical end-to-end cuts) and then combines the optimized sets for the subrectangles may not result in the optimized set for the original rectangle being computed.

Figure 2B:
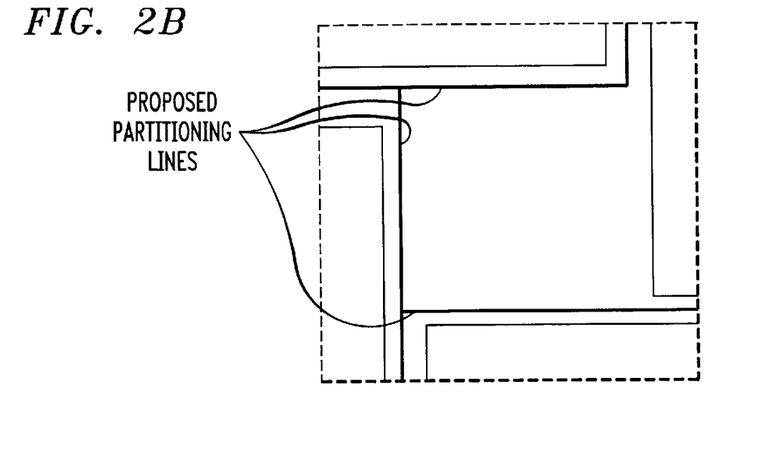
Figure 2C:
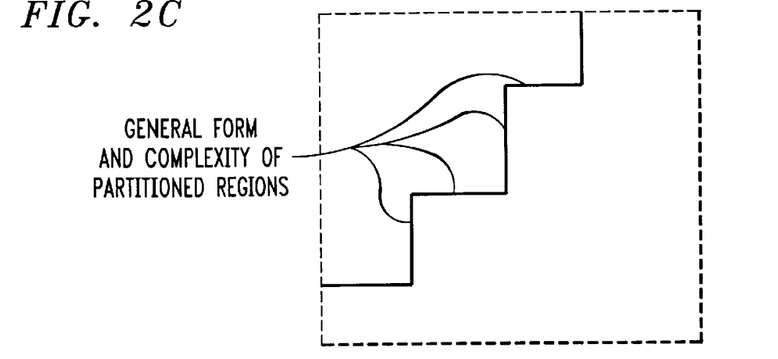

In order to compute optimized sets using the dynamic programming approach, we need to consider cuts of the form shown in FIG. 2B that originate at a point and split a region into two subregions, one of them being the portion of the region in the upper left quadrant (with the point as origin). The problem with this approach is that the subregions due to such cuts are not perfect rectangles but regions of the form shown in FIG. 2C. The right and lower edges of regions generated by the algorithm (due to the cuts) are always straight lines, while the other edges can define as many as k steps. Since the number of such regions is $O(n^2 k)$, the complexity of the dynamic programming algorithm that computes the optimized set using such cuts is exponential.

The following subsection describes a dynamic programming algorithm with polynomial time complexity that computes approximations to optimized sets.

Approximation Algorithm Using Dynamic Programming

The procedure optSup2D for computing approximate optimized support sets is a dynamic programming algorithm that uses simple end-to-end horizontal and vertical cuts for splitting each rectangle into two subrectangles. The algorithm is a generalization of the algorithm optSup1D for the one-dimensional case, except for the following three differences. First, unlike the case for one dimension in which we considered only vertical cuts, for two dimensions we need to consider both vertical and horizontal cuts. Second, for the one-dimensional case, once we split an interval into two subintervals, we computed the optimized set of size at most one for the first subinterval and an optimized set of size k−1 for the second. This approach worked for the one-dimensional case since, for any optimized set, there exists a split such that the first subinterval contains one optimized set interval while the second contains k−1 optimized intervals. However, for the two-dimensional case, each of the two subrectangles (resulting from any split) may contain more than one, or parts of more than one, rectangle belonging to the optimized set. As a result, we need to compute the optimized set of size $k_1$ for the first subrectangle and $k_2$ for the second, for all values of $k_1$ and $k_2$ such that $k_1 + k_2 = k$. Finally, the procedure only computes approximations of optimized sets since the cuts may not cleanly divide the rectangles in the optimized set. The above discussion also applies to optGain2D, the procedure for computing optimized gain sets.

Procedure optSup2D, as set out in the algorithm below, accepts as input parameters, the coordinates of the lower left ((i, j)) and upper right ((p, q)) points of the rectangle for which the optimized set is to be computed. These two points completely define the rectangle. The final parameter is the bound on the number of rectangles that the optimized set can contain. The array optSet((i, j(, (p, q), k) is used to store the optimized set with size at most k for the rectangle, thus preventing recompilations of the optimized set for the rectangle. As for the one dimensional case, the confidence and support for each rectangle is precomputed.

For k>1, vertical cuts between i and i+1, i+1 and i+2, . . . , p−1 and p are used to divide rectangle ((i, j), (p, q)) into subrectangles((i, j), (l, q)) and ((l+1, j), (p, q)) for all $i \leq l \leq p-1$. For every pair of rectangles generated above, optimized sets of size $k_1$ and $k_2$ are computed by recursively invoking optSup2D for all $k_1, k_2$ such that $k_1 + k_2 = k$. After similarly generating pairs of subrectangles using horizontal cuts, the optimized set for the original rectangle is set to the union of the optimized sets for the pair with the maximum support.

| Algorithm for computing 2D optimized support set |
| --- |
| procedure optSup2D((i, j), (p, q), k) |

```
begin
 1.    if computed (optSet2D((i, j), (p, q), k)) = true
 2.       return optSet2D((i, j), (p, q), k)
 3.    if conf((i, j), (p, q)) ≧ minConf {
 4.       optSet2D((i, j), (p, q), k) : = ((i, j), (p, q))
 5.       return optSet2D((i, j), (p, q), k)
 6.    }
 7.    optSet₁ : = optSet₂ : = 0
 8.    if p > i {
 9.       if k = 1
10.          optSet₁ := maxSupSet(optSup2D((i, j), (p − 1, q), 1),
                         optSup2D((i + 1,j) (p, q), 1))
11.       else
12.          for l := i to p − 1 do
13.             for m = 1 to k − 1 do
14.                optSet₁ := maxSupSet(optSet₁, optSup2D((i, j),
                            (l, q), m) ∪ optSup2D((l + 1, j), (p, q), k − m)
15.    }
16.    if q > j {
17.       if k = 1
18.          optSet₂ := maxSupSet(optSup2D((i, j), (p, q − 1), 1),
                         optSup2D((i, j + 1), (p, q), 1))
19.       else
20.          for l := j to q − 1 do
21.             for m := 1 to k − 1 do
22.                optSet₂ := maxSupSet(optSet₂, optSup2D((i, j), (p, l),
                            m), ∪ optSup2D((i, l + 1), (p, q), k − m))
23.    }
24.    optSet2D((i, j), (p, q), k) := maxSupSet(optSet2D((i, j),
                (p, q), k, optSet₁, optSet₂)
25.    return optSet2D((i, j), (p, q), k)
end
```

The number of points input to our dynamic programming algorithm for the two-dimensional case is $N=n^2$ since n is the size of the domain of each of the two uninstantiated numeric attributes.

The procedure for computing optimized gain sets, optGain2D, is similar to optSup2D except that, if conf((i, j), (p, q))≧minConf, then we must not return optSet as is done in Step 5. The reason for this is that even though the gain for the rectangle ((i, j), (p, q))is positive, there may be subrectangles in the rectangle whose gain is higher and thus one must consider the optimized sets for the subrectangles obtained due to vertical and horizontal cuts. Furthermore, all calls to optSup2D must be replaced by calls to optGain2D.

Optimality Results

As mentioned earlier, with simple end to end cuts, the dynamic programming approach may not result in the optimized set being computed. The following identifies restrictions under which optSup2D yields optimized sets and bounds on how far the computed approximation for the general case can deviate from the optimized set.

Figure 3:
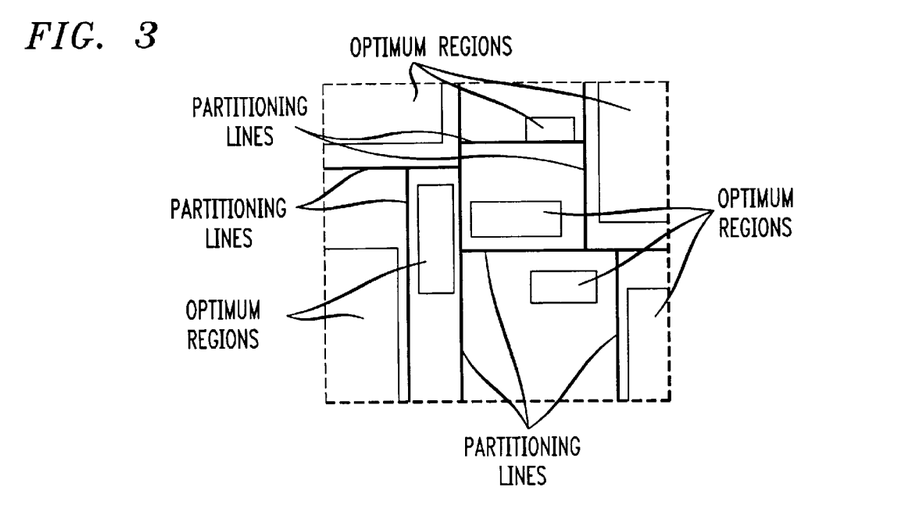

Let us define a set of rectangles to be binary space partitionable whenever it is possible to recursively partition the plane such that no rectangle is cut, and each partition contains at most one rectangle. For example, the set of rectangles in FIG. 3 is binary space partitionable (the bold lines are a partitioning of the rectangles). However, the set in FIG. 2A is not.

If we are willing to restrict the optimized set to only binary space partitionable rectangles, then it can be shown, and a corresponding theorem is readily proved, that procedure optSup2D computes the optimized set. Note that any set of 3 or fewer rectangles in a plane is always binary space partitionable. Thus, for k<3, optSup2D computes the optimized set. Similarly, it can be shown that procedure optGain2D computes the optimized binary space partitionable gain set. In the general case, the approximate optimized gain set computed by procedure optGain2D is within a factor of ¼ of the optimized gain set.

For the optimized support set, however, we cannot show a bound of ¼. The reason for this is that for the optimized support set, even though one of the four subrectangles of each optimized rectangle has support ¼ times the support of the rectangle, its confidence may be less than minConf. As a result, the subrectangles with maximum support may not qualify to be in the optimized set. This is not true in the optimized gain case since a subrectangle of the rectangle with ¼ times the gain of the rectangle has a non-negative gain (assuming the rectangle has a non-negative gain).

Experimental Results

In this section is described the performance of the disclosed algorithms for computing optimized support and optimized gain sets for the one-dimensional case, that is, the mining of the data set with respect to one uninstantiated condition. In particular, the bucketing and divide and conquer optimizations make the dynamic programming algorithm highly scaleable. For instance, domains of sizes as high as 100,000 can be analyzed in a few seconds. Furthermore, mining as many as 250 intervals for 100,000 domain values can be achieved in a matter of a few minutes. The sensitivity of the above two optimizations to the minimum confidence threshold has been determined.

In experiments based on the present invention, the data file is read only once at the beginning of each algorithm in order to compute the support, confidence and gain for every point. The time for this, in most cases, constitutes a tiny fraction of the total execution time of our algorithms. Thus, we do not include the time spent on reading the data filed in our results. Furthermore, note that the performance of our algorithms does not depend on the number of tuples in the data file. It is more sensitive to the size of the attribute's domain n and the number of intervals k. Our experiments were performed on a Sun Ultra-2/200 machine with 512 MB of RAM and running Solaris 2.5.

Synthetic Datasets

The association rule tested by the experiments has the form U ∧ C1→C2 where U contains 1 uninstantiated attribute whose domain consists of integers ranging from 1 to n. Every domain value (that is, point in one-dimensional space) is assigned a randomly generated confidence between Ø and 1 with uniform distribution. Each value is also assigned a randomly generated support between Ø and 2/n with uniform distribution; thus, the average support for a value is 1/n.

Bucketing and Divide and Conquer

Figure 4A:
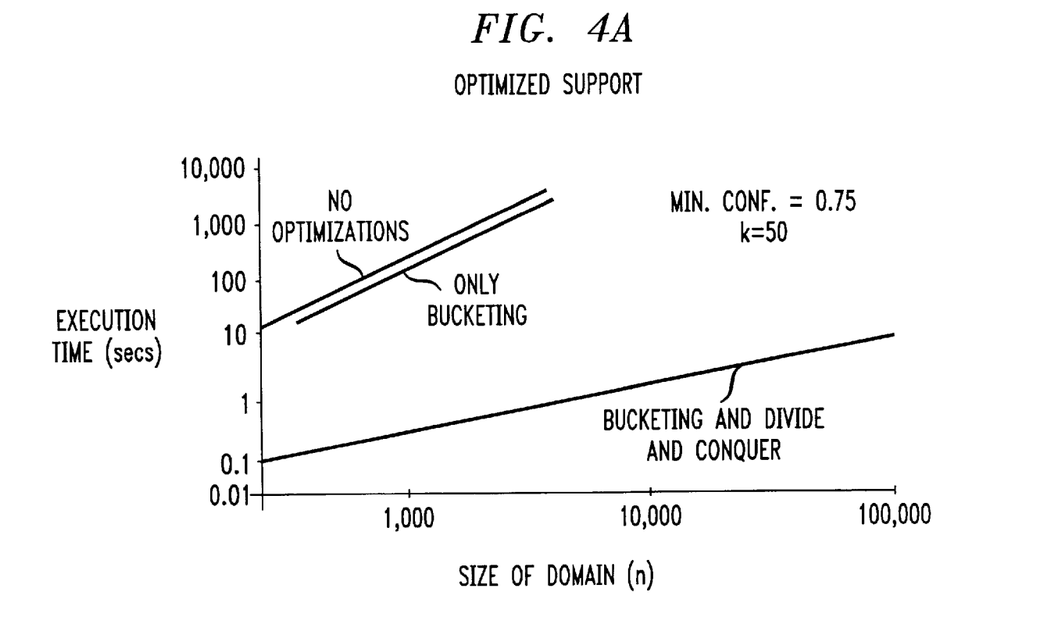
FIGS. 4A and 4B show graphs related to the invention.

This subsection describes the improvements in execution times that result due to the subsidiary features that have been termed bucketing and divide and conquer optimizations. In FIG. 4A is plotted the performance of three variants of our algorithm as the domain size is increased from 500 to 100,000–(1) with no optimizations, (2) with only bucketing, and (3) with both bucketing and divide and conquer. Log scale are represented values along both axes. Also, in the experiments, we fix the number of intervals k at 50 and use a minimum confidence threshold of 0.75.

For both optimized support and gain, the new dynamic programming algorithm, without the subsidiary features, took times in excess of 30 minutes for as few as 5000 values in the domains of the attributes. On the other hand, with both bucketing and divide and conquer, the algorithm took less than 15 seconds for domain sizes as high as 100,000. From the graphs, it follows that the major portion of the performance improvement results due to divide and conquer. Even though bucketing does reduce input size, these reductions are small for optimized support (about 5–6%), but significantly larger for optimized gain (about 65%). Divide and conquer, on the other hand, partitions the original problem of size b into m subproblems of size at most $b_{max}$ and has complexity $O(b_{max}^2 mk+mk^2)$. For n=100,000 and the optimized support case, divide and conquer splits the b=95000 buckets into m=13000 partitions each of whose size is less than $b_{max}$=20. Obviously, since $b_{max}<<b$, k<<b and m<b, it follows that the computational complexity of divide and conquer is much smaller than $O(b^2 k)$, the complexity with only bucketing. The effectiveness of bucketing and divide and conquer depend on minConf values.

Scale-up with n

Figure 4B:
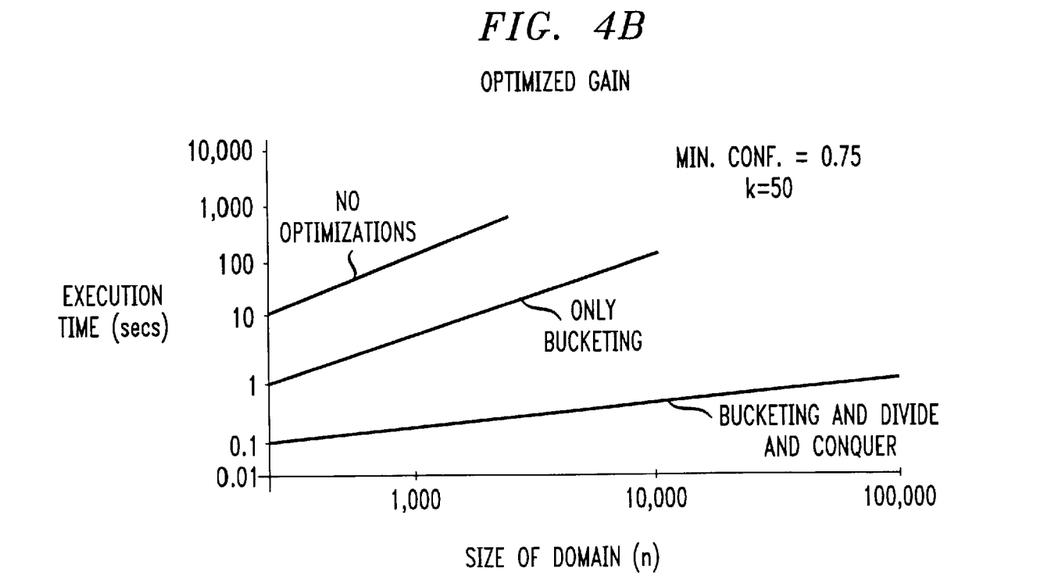

FIGS. 4A and 4B also shows how the algorithms with and without subsidiary-feature optimizations scale with the input size n. Due to the quadratic complexity of our algorithm, we found that as n doubles, without optimizations, the execution time increases almost four-fold. This is in line with what we expected. The same holds when we use only the bucketing optimization.

With the divide and conquer strategy, the complexity of our algorithm is $O(b_{max}^2 mk+mk^2)$, where m is the number of partitions and $b_{max}$ is the size of the largest partition. Thus, if with increasing n, $b_{max}$ stays approximately the same

TABLE 2

Scale-up with Input Size n

| n | b | m | $b_{max}$ |
|---|---|---|---|
| Optimized Support | | | |
| 500 | 464 | 80 | 9 |
| 1000 | 945 | 140 | 11 |
| 2000 | 1897 | 293 | 16 |
| 5000 | 4704 | 743 | 16 |
| 7500 | 7084 | 1123 | 17 |
| 10000 | 9432 | 1518 | 19 |
| 50000 | 47932 | 6847 | 16 |
| 100000 | 95813 | 13512 | 20 |
| Optimized Gain | | | |
| 500 | 195 | 80 | 6 |
| 1000 | 354 | 140 | 8 |
| 2000 | 738 | 293 | 8 |
| 5000 | 1829 | 743 | 10 |
| 7500 | 2759 | 1123 | 8 |
| 10000 | 3711 | 1518 | 12 |
| 50000 | 16321 | 6847 | 10 |
| 100000 | 32266 | 13512 | 12 | and m increases linearly with n, then we can expect the divide and conquer algorithm to exhibit a linear scale-up with increasing n. This is exactly what we observe for both the optimized support and gain cases.

Table 2 contains the values of m and $b_{max}$ for increasing values of n. For optimized support, $b_{max}$ stays in a narrow range between 15 and 20, while for optimized gain, $b_{max}$ varies between 8 and 12. Furthermore, for both cases, m increases almost linearly with respect to n from 80 (for n=500) to 13500 (for n=100,000). Thus, as n increases, the cost of computing the optimized sets for each partition stays approximately the same, and the algorithm only incurs a linear increase in the cost for computing optimized sets for all the partitions and then combining them.

Note that for a given value of n, the number of partitions m is the same for optimized support and gain. This is because the partition points for both optimized support and gain are identical.

Sensitivity to minConf

For n=5000 and k=50, execution times for the algorithms according to the invention have been determined as minConf is varied from 0.2 to 0.9. The divide and conquer optimization exhibits the same behavior for both optimized support and gain. However, the bucketing feature behaves differently for the optimized support and optimized gain cases. First, without any optimizations, the performance of the dynamic programming algorithm becomes worse as confidence increases. The reason for this is that, for optimized support, if the confidence of an interval in minConf or higher, the optimized set for the interval

TABLE 3

| minConf | b | m | $b_{max}$ |
|---|---|---|---|
| OPTIMIZED SUPPORT | | | |
| 0.2 | 1841 | 1 | 1840 |
| 0.3 | 2646 | 1 | 2645 |
| 0.4 | 3298 | 1 | 3297 |
| 0.45 | 3610 | 1 | 3609 |
| 0.5 | 3812 | 1 | 3811 |
| 0.55 | 4053 | 136 | 258 |
| 0.6 | 4248 | 395 | 121 |
| 0.7 | 4576 | 708 | 21 |
| 0.8 | 4812 | 686 | 1214 |
| 0.9 | 4956 | 399 | 4 |
| OPTIMIZED GAIN | | | |
| 0.2 | 1620 | 1 | 1615 |
| 0.3 | 2166 | 1 | 2165 |
| 0.4 | 2489 | 1 | 2488 |
| 0.45 | 2553 | 1 | 2552 |
| 0.5 | 2539 | 1 | 2538 |
| 0.55 | 2451 | 136 | 172 |
| 0.6 | 2355 | 396 | 70 |
| 0.7 | 2063 | 708 | 14 |
| 0.8 | 1537 | 686 | 8 |
| 0.9 | 829 | 399 | 2 | is the interval itself, and further recursive calls for the interval are not needed. When minConf is small, there are a large number of such intervals with confidence at least minConf.

In Table 3, for a given confidence, presented are the number of buckets generated by the bucketing algorithm b, the number of partitions generated by the divide and conquer algorithm m, and the maximum size of a partition $b_{max}$. From the table 3, three observations follow: (1) as the confidence increases, the number of buckets input to out algorithm increases, (2) for values of minConf that are lower than 0.5, the divide and conquer optimization has no effect, and (3) as the confidence increases beyond 0.5, for increasing confidence values, the maximum partition size decreases.

The reason for Point (1) is that the bucketing algorithm coalesces contiguous values with confidence more than minConf and at lower minConf values, there are a larger number of such values. Points (2) and (3) can be attributed to the fact that the number of partition points increases as the confidence increases (and the number is Ø when minConf is less than 0.5). With only bucketing, at lower minConf values, due to the smaller number of buckets and consequently the smaller input sizes, the performance of the algorithm with bucketing is much better than without bucketing. However, as the confidence increases, the reductions in input size become smaller and smaller, and thus the bucketing optimization has very little effect for large confidence values. The performance of the algorithm with both bucketing and divide and conquer enhancements is more interesting. First, since for confidence values below 0.5, divide and conquer does not generate any partitions, the performance of our algorithm with and without divide and conquer is the same. However, beyond 0.5, divide and conquer kicks in and the execution times decrease as confidence increases. The smaller sizes of partitions is primarily responsible for this.

For optimized gain, since contiguous values with confidence both greater than minConf and less than minConf, are merged into a single bucket by the bucketing algorithm, the smallest number of buckets are produced for extreme confidence values. Thus, as illustrated in Table 3, as the confidence increases from 0.2 to 0.5, the number of buckets generated first increases and then for confidence values beyond 0.5, it falls. Since the performance depends on the number of buckets, with only the bucketing optimization, the execution times are maximum around confidence values of 0.5 and grow smaller as they approach 0.2 or 0.9. Without any bucketing, the performance is much worse since bucketing reduces the input size by as much as 50%. Also, without bucketing, the execution times are constant for all confidence values (unlike the optimized) support case) since even if an interval has confidence that exceeds minConf, further recursive calls may be necessary to compute the optimized set for the interval. Finally, as for the optimized support case, since divide and conquer becomes effective once the confidence exceeds 0.5 and partition sizes decrease with increasing confidence values, the divide and conquer optimization results in improved performance as confidence increases.

Scale-up with k

In order to determine how the algorithm with both the bucketing and divide and conquer optimizations scales for increasing values of k, k is varied between 10 and 250 with a domain size of 100,000 and minConf=0.75. The results of the experiments for the optimized support and gain cases show that the execution times increase slightly more than linearly as k is increased. The reason for this is that the complexity of the divide and conquer algorithm is $O(b_{max}^2 mk+mk^2)$. The first term, which is the complexity of computing optimized sets for the m partitions, increases linearly with k. However, the second term, which is the cost of combining the results for the partitions to get the final optimized set has complexity that is quadratic in k. Thus, the increase in execution times for the algorithms is somewhere between linear and quadratic for increasing k. On an average, computation times increase about 3-fold every time k doubles. Note that for values of k much larger than $b_{max}$, a majority of the time is spent in combining the results for the various partitions. Thus, subsequent increases in the value of k could result in quadratic increases in execution times when the divide and conquer optimization is employed for the mining of the data set with respect to a single uninstantiated condition. Further, for the mining of the data set with respect to two uninstantiated conditions, the technique is just the basic dynamic programming algorithm described above, for which experimental results are not presented.

Nevertheless, the actual practice of the invention, for both one and two uninstantiated conditions, should show that the main thrust of the novel algorithms in uncovering hidden trends in data in a large data base will have uses, such as in statistical research and in commerce, other than the telephony marketing described above. The present invention is particularly useful for uncovering a plurality of hidden local trends of a particular type in the large data set, as needed in a rapidly increasing number of areas of endeavor. While, in the case of two uninstantiated conditions, the results are exact for a plurality separate optima of 2 or 3, the usefulness extends far beyond that to a number of disjunctions, local trends in the data, that exceed 3, for which highly practical approximate results may be obtained. For all of the foregoing reasons, the following claims are not limited to a particular set of uses.

It should be understood that the techniques and arrangement of the present invention can be varied significantly without departing from the principles of the invention as explained above and claimed hereinafter.

What is claimed is:

1. A method for mining an at least partially optimized association rule from a data set for every point of which support, confidence, and gain are available, said at least partially optimized association rule containing at least one uninstantiated condition A, comprising the steps of:

providing the data set in a form usable by an electronic central processing unit;

computing in the central processing unit via a dynamic programming algorithm a plurality k of separate regions of interest for particular application of the uninstantiated condition A having optimal support, each region having at least a minimum confidence, each optimal separate region being optSet(i, j, l), where each interval(i, j) contains at most 1 non-overlapping intervals, satisfying the following theorem:

---

If, for i < j, conf{(i, j)} < minConf, then the optimized set optSet(i, j, l) is
● l = 1: optSet(i, j-1, 1), if sup(optSet(i, j-1, 1) < sup(optSet(i + 1, j, 1). (optSet(i + 1, j, 1), otherwise.
● l = 1: optSet(i, r, 1) ∪ optSet(r + 1, j, l-1)
where i ≦ r < j is such that optSet(i, r, 1) ∪ optSet(r + 1, j, l − 1) is maximum,

--- the dynamic programming algorithm being:

--- procedure optSup1D(i, j, l)

begin
1. if computed (optSet(i, j, l)) = true
2.  return optSet(i, j, l)
3. if conf((i, j)) ≧ minConf {
4.  optSet(i, j, l): = ((i, j))
5.  return optSet(i, j, l)
6. }
7. tmpSet := 0
8. if i < j {
9.  if l = 1
10.   tmpSet := maxSupSet(optSup1D(i, j − 1, 1), optSup1D(i + 1, j, 1))
11.  else
12. for r: = i to j − 1 do
13.  tmpSet := maxSupSet(tmpSet, optSup1D(i, r, l) ∪ optSup1D(r + 1, j, l − 1)
14. }
15. optSet(i, j, l) := maxSupSet(optSet(i, j, l), tmpSet)
16. return optSet(i, j, l)
end,

--- where the algorithm is initially invoked with i=1, J=n, where n is the total number of values of the same type in the data set, k=1 (or other desired value of k), and recursion occurs on i and j for each value of k, and delivering from the electronic central processing unit to a utilization apparatus a commercially useful listing as a signal representing each optSet(i, j, l) for said plurality k of separate regions.

2. The method according to claim 1, further comprising the steps of:
   collapsing contiguous ranges of values of the same type in the data set into b buckets, where b is less than n, including determining each bucket to contain only contiguous values for which confidence is always greater than minConf or is always less than minConf within the bucket prior to the computing and delivering steps; and
   combining the results for buckets for which confidence is always greater than minimum confidence after the computing step and before the delivering step, whereby computation time is reduced.

3. The method according to claim 2, further comprising the step of dividing the range of values of the same type within each bucket for which confidence is greater than minConf in the data set into a plurality of subranges,
   and wherein the computing step includes:
      invoking the algorithm separately in each subrange with separate attendant recursion in each subrange; and
combining returned optSets(i, j, l) for the plurality of subranges within each bucket for which confidence is greater than minConf in the data set before the delivering step, whereby computation time is further reduced.

4. The method according to claim 1, further comprising the step of dividing the range of values of the same type in the data set into a plurality of subranges,
   and wherein the computing step includes:
      invoking the algorithm separately in each subrange with separate attendant recursion in each subrange; and
      combining returned optSets(i, j, l) for the plurality of subranges before the delivering step, whereby computation time is reduced.

5. A method for mining an at least partially optimized association rule from a data set for every point of which support, confidence, and gain are available, said at least partially optimized association rule containing at least one uninstantiated condition A, comprising the steps of:
   providing the data set in a form usable by an electronic central processing unit;
   computing in the central processing unit via a dynamic programming algorithm a plurality k of separate regions of interest for particular application of the uninstantiated condition A having optimal gain, each region having at least a minimum confidence, each optimal region maxGainSet(i, j, l), where each interval (i, j) contains at most l non-overlapping intervals, satisfying the following theorem:

For i < j, optSet(i, j, l) is
● l = 1: maxGainSet((i, j,), optSet(i, j-1, 1), optSet(i + 1, j, 1)).
● l > 1: maxGainSet((i, j), optSet((i, i, 1) ∪ optSet(i + 1, j, l-1), . . ., optSet (i, j-1, 1) ∪ optSet(i, j, l − 1)), the dynamic programming algorithm being:

| procedure optGain1 D(i, j, l) |
|---|
| begin |
| 1.     if computed (optSet(i, j, l)) = true |
| 2.       return optSet(i, j, l) |

| -continued |
|---|
| procedure optGain1 D(i, j, l) |
| 3.     if conf((i, j)) ≧ minConf { |
| 4.       optSet(i, j, l): = ((i, j)) |
| 5.     } |
| 6.     tmpSet := 0 |
| 7.     if i < j { |
| 8.       if l = 1 |
| 9.         tmpSet := maxGainSet(optGain1 D(i, j − 1, 1), optGain1 D(i + 1,j, 1)) |
| 10.    else |
| 11.       for r:= i to j − 1 do |
| 12.         tmpSet := maxGainSet(tempSet, optGain1 D(i, r, 1) ∪ optGain1 D(r + 1, j, l − 1) |
| 13.    } |
| 14.    optSet(i, j, l) := maxGainSet(optSet(i, j, l), tmpSet) |
| 15.    return optSet (i, j, l) |
| end, | where the algorithm is initially invoked with i=1, J=n, where n is the total number of values of the same type in the data set, k=1 (or other desired value of k), and recursion occurs on i and j for each value of k; and
delivering from the electronic central processing unit to a utilization apparatus a signal useful for sales promotion representing each optSet(i, j, l) for said plurality k of separate regions.

6. The method according to claim 5, further comprising the steps of:
   collapsing contiguous ranges of values of the same type in the data set into b buckets, where b is less than n, including determining each bucket to contain only contiguous values for which confidence is always greater than minConf or is always less than minConf within the bucket prior to the computing and delivering steps; and
   combining the results for buckets for which confidence is always greater than minConf after the computing step and before the delivering step, whereby computation time is reduced.

7. The method according to claim 6, further comprising the step of dividing the range of values of the same type within each bucket for which confidence is greater than minConf in the data set into a plurality of subranges,
   and wherein the computing step includes:
      invoking the algorithm separately in each subrange with separate attendant recursion in each subrange; and
combining returned optSets(i, j, l) for the plurality of subranges within each bucket for which confidence is greater than minConf in the data set before the delivering step, whereby computation time is further reduced.

8. The method according to claim 5, further comprising the step of dividing the range of values of the same type in the data set into a plurality of subranges,
   and wherein the computing step includes:
      invoking the algorithm separately in each subrange with separate attendant recursion in each subrange; and
      combining returned optSets(i, j, l) for the plurality of subranges before the delivering step, whereby computation time is reduced.

9. A method for mining an at least partially optimized association rule from a data set of telephone usage for every point of which support, confidence, and gain are available, said at least partially optimized association rule containing at least two uninstantiated conditions A1 and A2, comprising the steps of:

providing the data set in a form usable by an electronic central processing unit;

computing in the central processing unit via a dynamic programming algorithm a plurality k of separate regions of interest for particular application of the each of the uninstantiated conditions A1 and A2 having at least approximately optimal support, each region having at least a minimum confidence, each at least approximately optimal region optSet2D((i, j), (p, q), k)), where each interval (i, j), (p, q) contains at most k non-overlapping intervals, providing an optimized set of binary space partitionable rectangles:

the dynamic programming algorithm being:

---
procedure optSup2D((i, j), (p, q), k)
---
```
begin
1.      if computed (optSet2D((i, j), (p, q), k)) = true
2.         return optSet2D((i, j), (p, q), k)
3.      if conf((i, j), (p, q)) ≧ minConf {
4.         optSet2D((i, j), (p, q), k) : = ((i, j), (p, q))
5.         return optSet2D((i, j), (p, q), k)
6.      }
7.      optSet₁ : = optSet₂ : = 0
8.      if p > i {
9.         if k = 1
10.           optSet₁ := maxSupSet(optSup2D((i, j), (p - 1, q), 1),
                         optSup2D((i + 1,j) (p, q), 1))
11.        else
12.           for l := i to p - 1 do
13.              for m = 1 to k - 1 do
14.                 optSet₁ := maxSupSet(optSet₁, optSup2D((i, j),
                              (l, q), m) ∪ optSup2D((l + 1, j), (p, q), k - m)
15.     }
16.     if q > j {
17.        if k = 1
18.           optSet₂ := maxSupSet(optSup2D((i, j), (p, q - 1), 1),
                         optSup2D((i, j + 1), (p, q), 1))
19.        else
20.           for l := j to q - 1 do
21.              for m := 1 to k - 1 do
22.                 optSet₂ := maxSupSet(optSet₂, optSup2D((i, j), (p, l),
                              m), ∪ optSup2D((i, l + 1), (p, q), k - m))
23.     }
24.     optSet2D((i, j), (p, q), k) := maxSupSet(optSet2D((i, j), (p, q), k),
                     optSet₁, optSet₂)
25.     return optSet2D((i, j), (p, q), k)
end
``` where the algorithm is initially invoked with i=1, J=n, p=1, and q=n, where n is the total number of values of the same type in the data set, k=1 (or other desired value of k), and recursion occurs on i, j, p, and q for each value of k; and delivering from the electronic central processing unit to a utilization apparatus a listing for promoting telephoning as a signal representing each optSet2D((i, j), (p, q), k) for said plurality k of separate regions, each optSet2D((i, j), (p, q), k) being approximate if k>3.

10. A method for mining an at least partially optimized association rule from a data set of telephone usage for every point of which support, confidence, and gain are available, said at least partially optimized association rule containing at least two uninstantiated conditions A1 and A2, comprising the steps of:

providing the data set in a form usable by an electronic central processing unit;

computing in the central processing unit via a dynamic programming algorithm a plurality k of separate regions of interest for particular application of each of the uninstantiated conditions A1 and A2 having optimal gain, each region having at least a minimum confidence, each optimal region maxGainSet((i, j), (p, q), k)), where each interval (i, j), (p, q) contains at most k non-overlapping intervals, providing an optimized set of binary space partitionable rectangles:

the dynamic programming algorithm being:

---
procedure optGain2D((i, j), (p, q), k)
---
```
begin
1.      if computed (optSet2D((i, j), (p, q), k)) = true
2.         return optSet2D((i, j), (p, q), k)
3.      if conf((i, j), (p, q)) ≧ minConf {
4.         optSet2D((i, j), (p, q), k) : = ((i, j), (p, q))
5.      }
6.      optSet₁ : = optSet₂ : = 0
7.      if p > i {
8.         if k = 1
9.            optSet₁ := maxGainSet(optGain2D((i, j), (p - 1, q), 1),
                          optGain2D((i + 1,j) (p, q), 1))
10.        else
11.           for l := i to p - 1 do
12.              for m = 1 to k - 1 do
13.                 optSet₁ := maxGainSet(optSet₁, optGain2D((i, j),
                              (l, q), m) ∪ optGain2D((l + 1, j), (p, q), k - m)
14.     }
15.     if q > j {
16.        if k = 1
17.        optSet₂ := maxGainSet(optGain2D((i, j), (p, q - 1), 1),
                       optGain2D((i, j + 1), (p, q), 1))
18.        else
19.           for l := j to q - 1 do
20.              for m := 1 to k - 1 do
21.                 optSet₂ := maxGainSet(optSet₂, optGain2D((i, j), (p,
                              l), m), ∪ optGain2D((i, l + 1), (p, q), k - m))
22.     }
23.     optSet2D((i, j), (p, q), k) := maxGainSet(optSet2D((i, j), (p, q),
                     k), optSet₁, optSet₂)
24.     return optSet2D((i, j), (p, q), k)
end,
``` where the algorithm is initially invoked with i=1, J=n, p=1, and q=n, where n is the total number of values of the same type in the data set, k=1 (or other desired value of k), and recursion occurs on i, j, p, and q for each value of k; and delivering from the electronic central processing unit to a utilization apparatus a listing for promoting telephoning as a signal representing each optSet2D((i, j), (p, q), k) for said plurality k of separate regions, each optSet2D((i, j), (p, q), k) being approximate if k>3.

\* \* \* \* \*